United States Patent
Goering et al.

(10) Patent No.: US 11,412,654 B2
(45) Date of Patent: Aug. 16, 2022

(54) RESIDUE SHIELD FOR ROW CLEANER ON AN AGRICULTURAL MACHINE

(71) Applicant: Deere & Company, Moline, IL (US)

(72) Inventors: Kevin J. Goering, Cambridge, IA (US); Steven C. Young, Ankeny, IA (US); Mark E. Barker, Johnston, IA (US); Elijah B. Garner, Bettendorf, IA (US); Dennis W. Bode, Lenexa, KS (US); Susan G. Gray, Geneseo, IL (US); Chris W. Foster, Bettendorf, IA (US)

(73) Assignee: Deere & Company, Moline, IL (US)

( * ) Notice: Subject to any disclaimer, the term of this patent is extended or adjusted under 35 U.S.C. 154(b) by 328 days.

(21) Appl. No.: 16/555,874

(22) Filed: Aug. 29, 2019

(65) Prior Publication Data
US 2021/0059110 A1    Mar. 4, 2021

(51) Int. Cl.
*A01C 7/20* (2006.01)
*A01C 7/12* (2006.01)

(52) U.S. Cl.
CPC . *A01C 7/20* (2013.01); *A01C 7/12* (2013.01)

(58) Field of Classification Search
CPC .... A01C 7/20; A01C 7/12; A01C 7/00; A01C 7/08
See application file for complete search history.

(56) References Cited

U.S. PATENT DOCUMENTS

| 4,403,662 A | 9/1983 | Dietrich, Sr. |
| 5,133,414 A | 7/1992 | Youngkrantz |
| 2018/0098484 A1 | 4/2018 | Beaujot |
| 2019/0297769 A1* | 10/2019 | Zielke .............. A01C 5/064 |

FOREIGN PATENT DOCUMENTS

| AU | 2003231613 A1 | 2/2004 |
| WO | WO2008017822 A1 | 2/2008 |

* cited by examiner

*Primary Examiner* — Christopher J. Novosad
(74) *Attorney, Agent, or Firm* — Christopher J. Volkmann; Kelly, Holt & Christenson, PLLC (57) ABSTRACT

An agricultural planting machine includes a frame, a row unit supported by the frame, the row unit comprising a disk opener configured to create a furrow for planting agricultural material in a first row and a row cleaner disposed in a path of the disk opener and configured to move residue from the path. A residue shield is configured to shield a second row from the residue.

19 Claims, 6 Drawing Sheets

RESIDUE SHIELD FOR ROW CLEANER ON AN AGRICULTURAL MACHINE

FIELD OF THE DESCRIPTION

The present description generally relates to agricultural machines. More specifically, but not by limitation, the present description relates to a residue shield for a row cleaner on an agricultural planting or seeding machine, such as a grain drill or air seeder.

BACKGROUND

One example agricultural machine is a planting or seeding machine that includes row units configured to plant seeds in a plurality of rows. Examples of such machines include, but are not limited to, box drills, air seeders, and row crop planters. To maximize yield, the seeds are planted in furrows or trenches with proper depth based on various features such as crop type and soil conditions. In one example, row units can be configured to push a blade, disk, or other trench opener through the soil to create a trench for seeds to be placed in. Row units can also be configured to utilize a closing mechanism that follows the openers and pushes soil back into the opening, thereby filling the trench and covering the seeds. In addition to planting seeds for crops, such as corn, soybeans, sunflowers, and sugar beets, these example planting machines can be similarly used to evenly distribute other agricultural material such as fertilizers and herbicides.

In some agricultural methods, tilling or tillage is utilized to prepare a field before planting. Tilling typically uses mechanical agitation of the soil, such as digging, stirring, and/or overturning. However, there can be downside to tilling, such as reduced soil moisture, increased run-off, increased erosion, and increased fuel consumption due to additional operations in the field, among others.

To address some of these problems, many farming operations have adopted "low-till" or "no-till" approaches. Here, plant matter left over from previous harvests, called residue, is left in the fields between plantings. At the time of planting, a row cleaner is used to clear a small strip of the field of the residue before the seeds (and/or fertilizer) is placed in the ground. By removing the residue, the row cleaner provides for a clearer path for seed (and/or fertilizer) placement.

The discussion above is merely provided for general background information and is not intended to be used as an aid in determining the scope of the claimed subject matter.

SUMMARY

An agricultural planting machine includes a frame, a row unit supported by the frame, the row unit comprising a disk opener configured to create a furrow for planting agricultural material in a first row and a row cleaner disposed in a path of the disk opener and configured to move residue from the path. A residue shield is configured to shield a second row from the residue.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
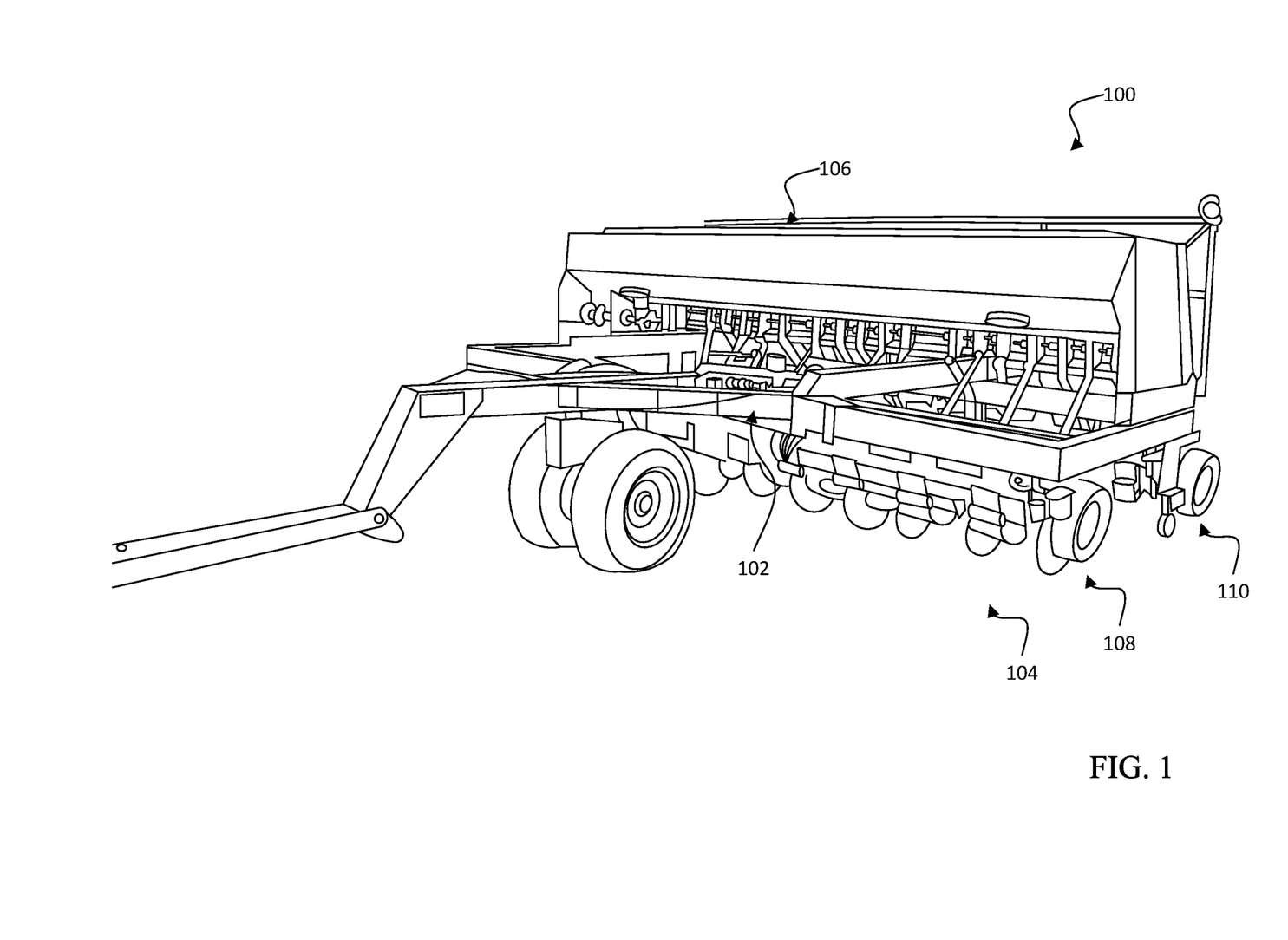
FIG. 1 illustrates one example of an agricultural planting machine that includes row units configured to plant seeds in a plurality of rows.

FIG. 1 illustrates one example of an agricultural planting or seeding machine 100 (referred to as machine 100) that includes a frame 102 supporting a plurality of row units 104 configured to plant seeds in a plurality of rows with a particular row spacing. A "planting" or "seeding" machine refers to an agricultural machine that sows or plants seeds (and/or fertilizer) of a variety of different seed/fertilizer types and row spacings.

Machine 100 is illustrated in the form of a grain or box drill having one or more product sources, such as tanks for seed and/or fertilizer. In the illustrated example, a seed grain box 106 opens downwardly into seed metering devices driven by a drive mechanism. The metered seed (and/or fertilizer) is conveyed to a plurality of row units that place the seed in rows. Grain drills are typically used for small grains, such as wheat, with row spacing approximately ten inches or less (e.g., typically in the range of 6 to 10 inches).

The row units can comprise a variety of mechanisms for dispersing agricultural material to the ground, including one or more ground-engaging components. Examples of ground-engaging components include a trench opener or other component(s) for forming a trench or furrow in the soil, a ground-engaging seed firmer, and/or ground-engaging components utilized in a trench depth sensing system.

Additionally, the individual row units can be arranged in a plurality of ranks. In the example of FIG. 1, a set of the row units are disposed in a front rank 108 and a set of row units are disposed in a rear rank 110. While machine 100 is illustrated with two ranks of row units, more than or less than two ranks can be utilized.

Further, it is noted that while machine 100 is illustrated in the form of a grain drill, machine 100 can comprise any of a variety of types of planting machines, such as an air seeder or a row crop planter, to name a few. In an air seeder example, an air cart is pulled in front of or behind an implement having a plurality of transversely spaced row units. The air cart has product tank(s) and utilizes a pneumatic distribution system to pneumatically distribute the product to the row units. Air seeders typically use more narrow row spacings (similar to box drills)(e.g., less than ten inches) than row crop planters which typically use row spacings greater than fifteen inches for row crops such as corn or soybeans.

Illustratively, each row unit 104 comprises a frame, a ground-engaging trench opener, and a ground-engaging trench closer, and can include other items as well. For instance, the row unit 104 can include a trench depth component for detecting and/or setting a depth of the trench created by the trench opener, and includes a material conveyance mechanism for conveying the material (seed and/or fertilizer) into the trench. The trench opener can be any of a variety of different mechanisms suitable to form the desired trench. In one example, the trench opener comprises a blade or blade-like mechanism to form the trench. For instance, the trench opener can comprise a hoe-style or chisel-style mechanism. In another example, the trench opener comprises one or more disks. For example, a pair of disks are often used for row spacings that are approximately fifteen inches or greater. In some implementations, single disk openers can provide better depth control and allow faster seeding speeds than hoe-style openers, thus providing better productivity.

In the example of FIG. 1, machine 100 uses a single disk on each row unit, and is suitable for narrower row spacings, such as five to fifteen inches. For sake of illustration, the present discussion will continue in the context of a single disk, but other types of trench openers can be utilized.

During operation, the disk opener can encounter residue on or near the soil surface (especially in the case of low-till and no-till applications). In some instances, the disk opener may slice through the residue to place the seed. However, this may not always be the case, especially in situations where the planting is performed in soft soil. Here, the residue can be pushed into the soil, instead of being cut, creating a situation referred to as "hair pinning" of the residue under the seed, which can hinder seed germination and growth. Further, in colder climates, failure to remove the residue from the row to allow the sun to warm the soil can also hinder emergence.

In accordance with one example, a row unit on a planting machine, such as machine 100 (e.g., a grain drill, air seeder, etc.), includes a row cleaner configured to remove residue for a row prior to the disk opener.

Figure 2:
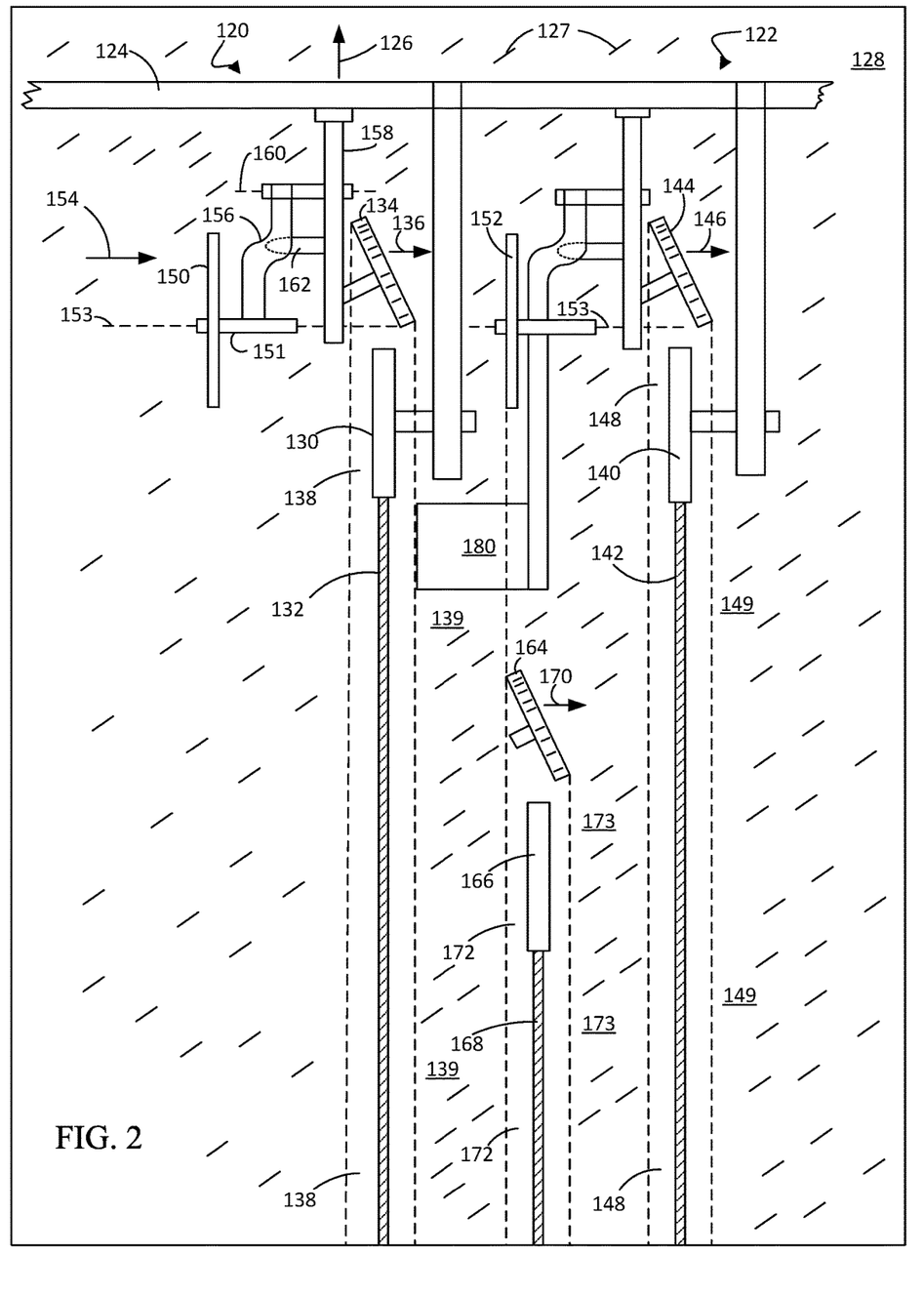
FIG. 2 is a schematic illustration of row units for an agricultural planting machine, in one example.

FIG. 2 illustrates a schematic diagram of a portion of machine 100, in one example. As shown, a pair of adjacent row units 120 and 122 are mounted on a portion of a frame 124 of machine 100. Machine 100 is moved (e.g., towed by a towing machine such as a tractor) in a direction represented by arrow 126. Machine 100 is illustrated performing a seeding operation over a terrain 128 that has not been tilled (e.g., no-till), or has been tilled minimally (e.g., low-till), prior to the seeding application. Thus, a significant amount of residue exists on the surface of the soil, as illustrated by shade lines 127 in FIG. 2.

Row unit 120 includes a trench opener 130 configured to engage and create a furrow 132 in the soil at a desired depth controlled by down pressure on opener 130. In the illustrated example, opener 130 comprises a single disk, but other trench openers can be utilized as noted above.

Row unit 120 also includes a row cleaner 134 that is disposed in a path of opener 130 in the direction of travel 126. Cleaner 134 is configured to engage the surface of the soil and move the residue to the side in a direction generation generally represented by arrow 136. A row cleaner can take any of a wide variety of forms. In the illustrated example, the row cleaner comprises a spiked wheel that is oriented at an angle with respect to the direction of travel 126. Thus, the area 138 of soil engaged by opener 130 is generally free of residue 127, or at least as significantly less residue 127 than the soil ahead of the cleaner 134. Further, an area 139 of heavy residue 127 is created between rows.

Seeding equipment (not shown in FIG. 2) is configured to place metered seed into furrow 132 and a trench or furrow closer (also not shown in FIG. 2) is configured to close furrow 132 after the seed is placed therein.

Row unit 122 illustratively includes similar components as row unit 120. That is, row unit 122 includes an opener 140 configured to create a furrow 142, a row cleaner 144 configured to move residue in a direction generally illustrated by arrow 146, to create an area 148 that is substantially free of residue. Further, an area 149 of heavy residue 127 is created between rows.

Depending on a number of factors such as, but not limited to, the amount of residue, the speed of machine 100, etc., the debris moved by row cleaner 134 may affect an adjacent row. This can be especially problematic with narrow row spacings, such as row spacings that are less than fifteen inches (e.g., seven inch spacings, ten inch spacings, etc.). Further, significant residue buildup can occur where the planting machine has a center row, where the adjacent row units each move the residue towards that center row unit. That is, a "center" row unit is not necessarily centered on the frame or machine itself, but rather refers to a row unit that is between two other row units that each are configured to move the residue toward that row unit.

As shown in FIG. 2, the row units include one or more residue shields that are disposed relative to the row cleaners and openers to block or otherwise hinder movement of the residue a certain distance from the row cleaner. Accordingly, each residue shield is configured to protect a particular row from residue thrown or moved by a row cleaner on an adjacent row. As shown in FIG. 2, row unit 120 includes a residue shield 150 and row unit 122 includes a residue shield 152. Residue shield 150 blocks residue thrown or moved from an adjacent row, which is generally represented by arrow 154, discouraging it from entering the area 138 where opener 130 is opening furrow 132. Similarly, residue shield 152 blocks the area 148 being cleared by row cleaner 144 from the residue being moved represented by arrow 136.

In the illustrated example, the residue shields comprise rolling disks that engage the surface of the soil with no (or low) down pressure provided by machine 100, and are configured to rotate on a spindle 151 about an axis 153. For example, residue shield 150 is mounted on row unit 120 by a float arm 156, coupled to an arm or bracket 158 that supports row cleaner 134. Float arm 146 is configured to pivot about an axis 160. Therefore, if row cleaner 134 and arm 158 are lowered, pivot arm 156 can pivot upward about axis 160 so that shield 150 traverses along the surface of soil with little or no down pressure into the soil. Accordingly, shield 150 can follow the contours of the field.

In other examples, a down pressure can be applied to the residue shield. This can be advantageous in applications having heavy residue to maintain rolling motion of the residue shield to discourage plugging. The down pressure can be applied in any a variety of ways. For example, a biasing mechanism, such as a spring, can be coupled to float arm 156 and apply a biasing force toward the ground.

In the illustrated example, the axes 153 of shields 150, 152 of the given rank are aligned with a rear of the row cleaners 134, 144 of the rank. Further, a support 162 of arm 158 is configured to engage the underside of float arm 156 when arm 158 is raised. Thus, shield 150 can be raised with row cleaner 134.

FIG. 2 also illustrates an example position for a row cleaner 164 on a row unit in a second (e.g., rear) rank. The row unit in the second rank includes, in one example, components similar to row unit 120. That is, the row unit in the second rank includes an opener 166 configured to create a furrow 168. Row cleaner 164 is configured to move residue in a direction generally illustrated by arrow 170, to create an area 172 that is substantially free of residue. Further, an area 173 of heavy residue 127 is created between rows.

Each row unit can include one or more other components as well. For instance, a residue windrower (generally represented by block 180) can be provided and configured to process the residue moved by cleaner 134. For instance, windrower 180 can tamp the residue down to hold it in place, or otherwise secure the position of the residue in a windrow.

It is noted that while residue shields 150 and 152 are illustrated as single rolling shields, other forms can also be utilized. For instance, a sliding or dragged shield can be utilized that is slid along the surface of the soil. One example comprises a generally rectangular plate with a curved front edge. In another example, a residue shield can be provided using air nozzles that are directed toward the residue being moved and output a flow of air that stops the residue in a windrow between the row cleaner and the adjacent row unit.

In another example, the residue shield can incorporate a fertilizer placement opener, configured to open a furrow for placement of fertilizer therein. In this case, a downforce can be provided with depth control so that the residue cleaner enters the soil to create a trench for the fertilizer at a desired depth.

It is noted that in the illustrated example each row unit has a single residue shield to protect the row unit from the residue being moved or thrown from an adjacent row unit. In the case of a center row unit, as mentioned above, the row unit can utilize a pair of residue shields on opposing sides of the trench opener to shield the row unit from the residue being moved by the adjacent row units. In another example, such as where lighter residue is expected, residue shields are only provided on the center row unit(s).

Figure 3:
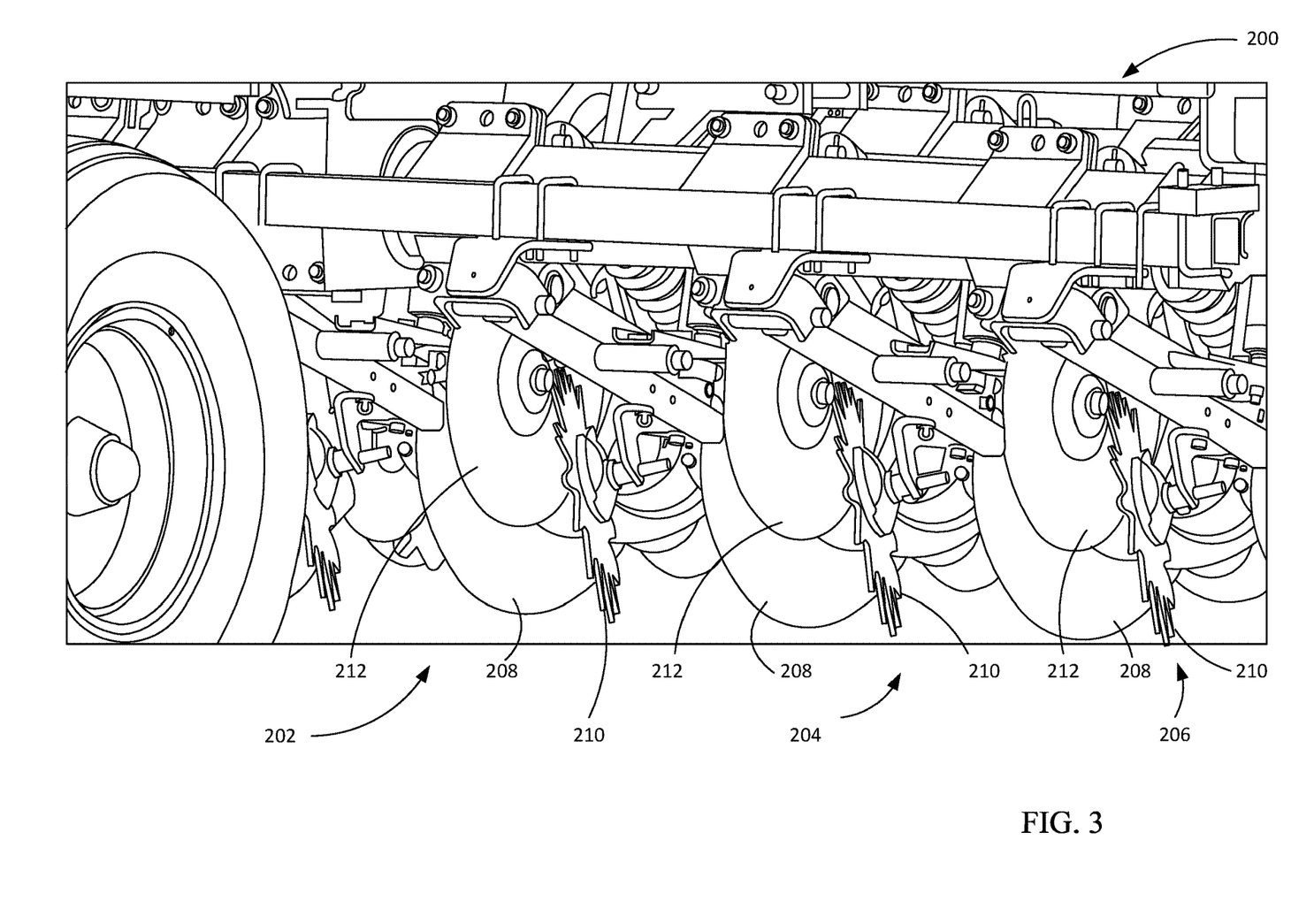
FIG. 3 is a front perspective view of row units of an agricultural planting machine, in one example.

FIG. 3 is a front perspective view of a portion of an agricultural planting machine 200, such as a grain drill or air seeder, in one example. Machine 200 includes a plurality of row units disposed in a plurality of ranks. That is, machine 200 includes at least a first, or forward, rank having a first set of row units that are disposed in front of a second, or rear, rank having a second set of row units. In one example, the front and rear ranks are interspersed, such that each row unit in a rear rank is positioned laterally between a pair of row units in the front rank. In other words, the row units alternate between the front and rear ranks.

Each row unit (e.g., row units 202, 204, 206) includes a single disk opener 208, a row cleaner 210 (illustratively in the form of a spiked wheel), and a residue shield 212. Residue shield 212 is mounted to the corresponding row unit by a float arm, and can be any of a variety of forms.

In the illustrated example, shield 212 comprises a smooth disk (i.e., having a smooth outer perimeter). In other examples, a notched disk or spiked wheel can be utilized, which can be advantageous in applications having heavy residue to maintain rolling motion of the residue shield to discourage plugging.

Further, in the illustrated example, shield 212 comprises a concave disk, which can provide a degree of flexibility for mounting variations to move the position of the disk side to side (e.g., to accommodate different row spacings). Of course, this can be accomplished in other ways as well, and a flat disk can also be utilized.

Figure 4:
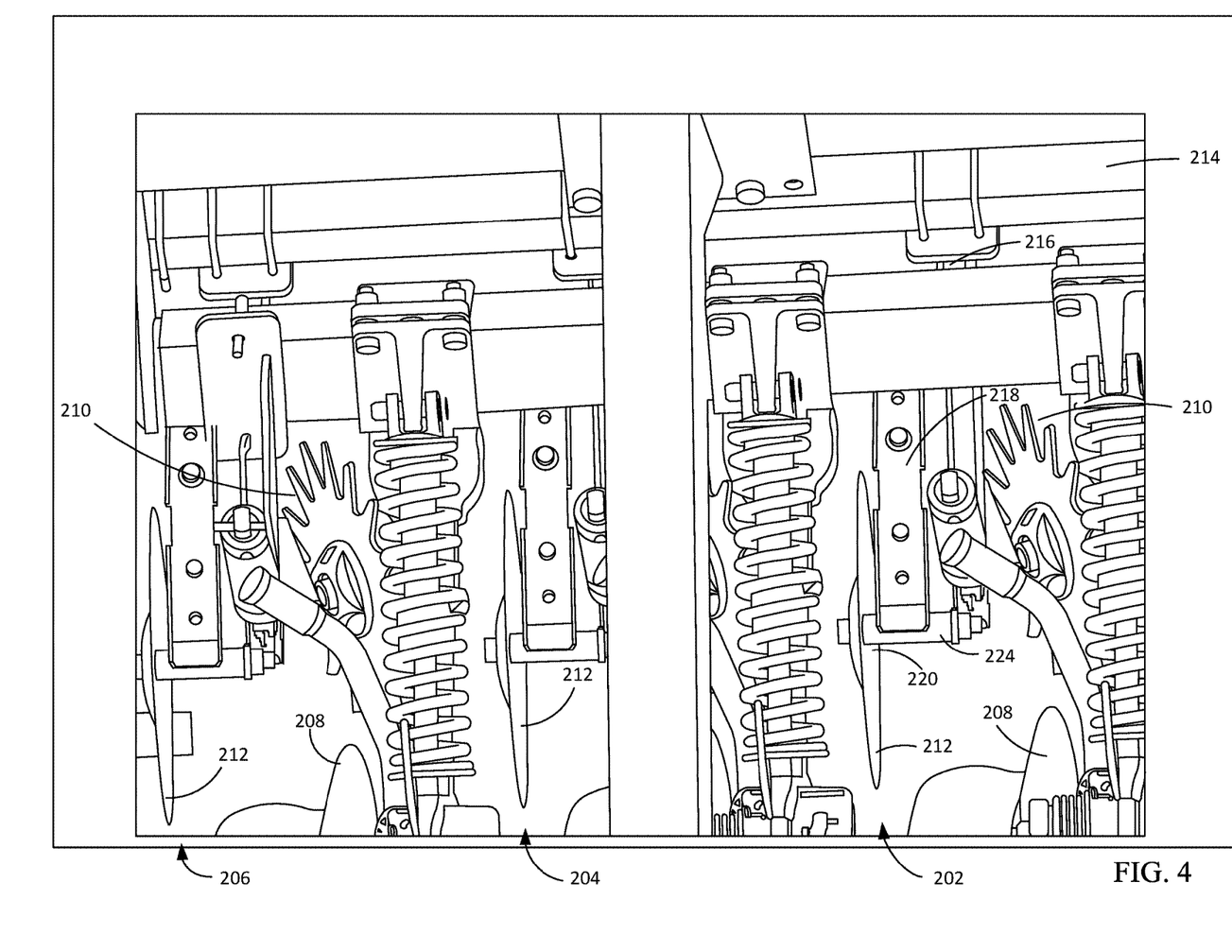
FIG. 4 is a top view of the row units shown in FIG. 3.

FIG. 4 is a top view of row units 202, 204 and 206. As shown, each row cleaner 210 is mounted to a frame 214 by an arm 216. The corresponding shield 212 is mounted to arm 216 by a float arm 218 at a pivot point (not shown in FIG. 4). Accordingly, float arm 218 allows shield 212 to follow the contour of the field, and to be raised along with the raising of arm 216. In the illustrated example, shield 212 is orientated such that the concave surface 220 (the right side of the disk as shown in FIG. 4) faces a spindle 224 that rotatably mounts shield 212 to float arm 218. The concave surface 220 allows shield 212 to be mounted more closely to float arm 218, thereby accommodating more narrow row spacings. In other words, a portion of spindle 224 is disposed within the recess formed by the concave surface 220. Float arm 218 is illustratively a "straight" arm to keep shield 212 closer to cleaner 210 and opener 208.

Figure 5:
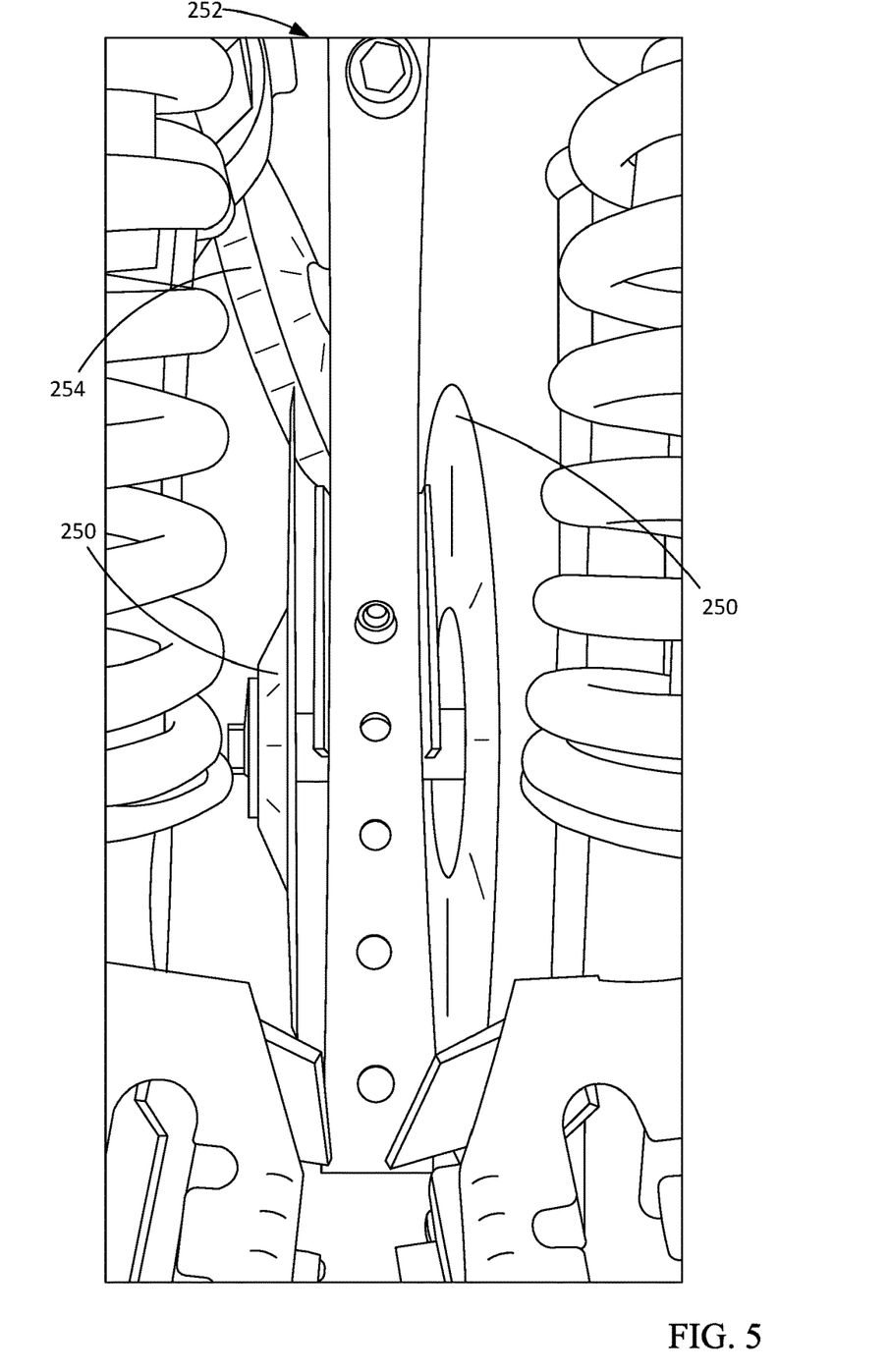
FIG. 5 illustrates one example of a pair of residue shields for a center row unit.

FIG. 5 illustrates one example of a pair of shields 250 for a center row as discussed above, center row 252 include a row cleaner 254 and is disposed between two adjacent rows that each are configured to move residue toward row 252.

Figure 6:
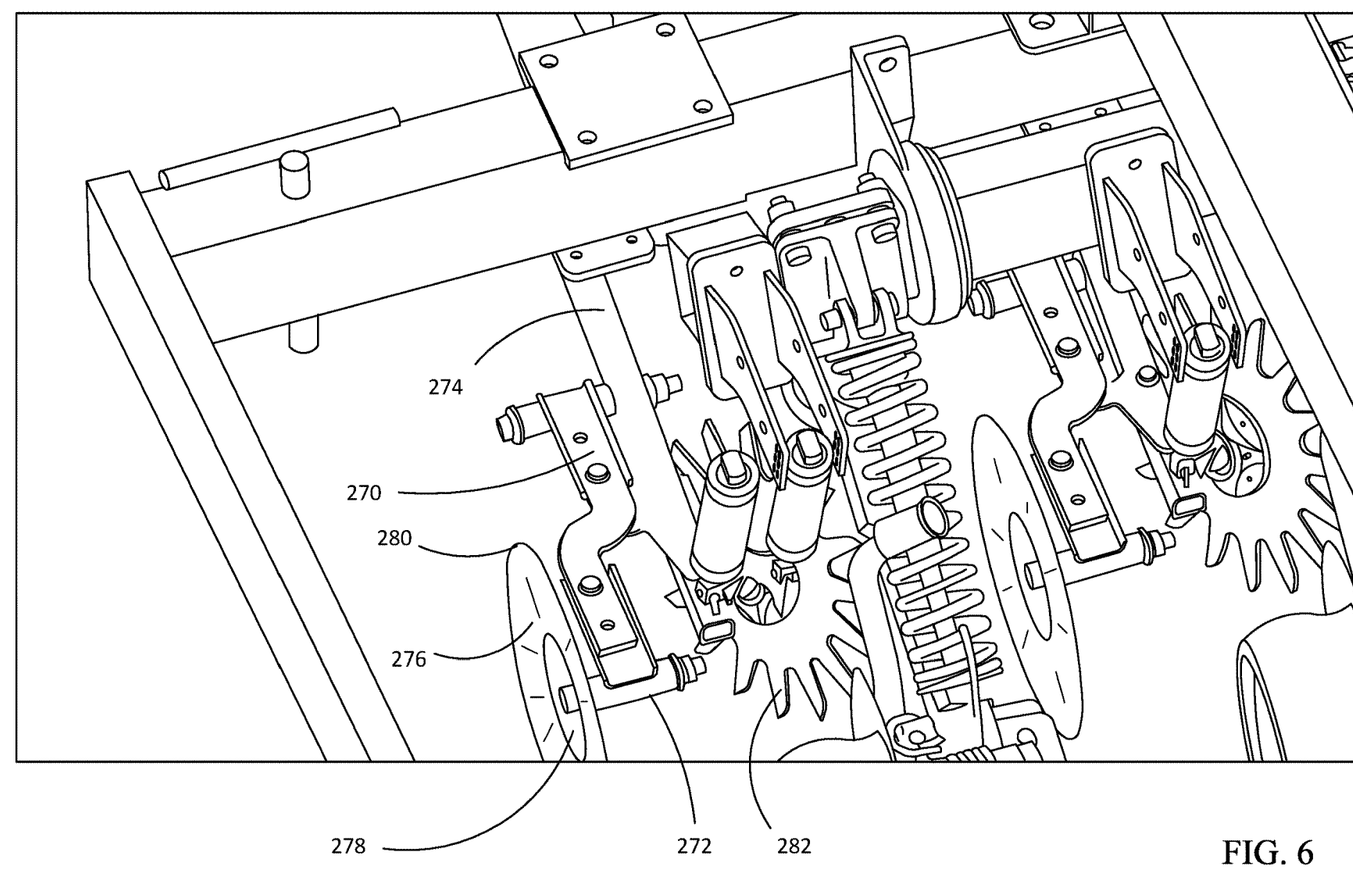
FIG. 6 illustrates one example of row units for an agricultural planting machine.

FIG. 6 illustrates one example of row units for an agricultural planting machine. In the example of FIG. 6, a row unit includes an offset float arm 270 that supports a spindle 272 on an arm 274. Offset arm 270 can accommodate larger row spacings (e.g., ten to fifteen inches). Concave shield 276 has its concave surface 278 facing in a direction away from spindle 272, thereby placing the residue-engaging surface 280 further away from row cleaner 282 (compared to the example of FIGS. 3 and 4).

It should also be noted that the different examples described herein can be combined in different ways. That is, parts of one or more examples can be combined with parts of one or more other examples. All of this is contemplated herein.

Example 1 is an agricultural planting machine comprising:
a frame;
a row unit supported by the frame, the row unit comprising:
a disk opener configured to create a furrow for planting agricultural material in a first row; and
a row cleaner disposed in a path of the disk opener and configured to move residue from the path; and
a residue shield configured to shield a second row from the residue.

Example 2 is the agricultural planting machine of any or all previous examples, wherein the agricultural planting machine comprises one of a grain drill or an air seeder.

Example 3 is the agricultural planting machine of any or all previous examples, wherein the agricultural planting machine comprises a row crop planter.

Example 4 is the agricultural planting machine of any or all previous examples, wherein the agricultural material comprises seed, and further comprising a distribution mechanism configured to place the seed in the furrow.

Example 5 is the agricultural planting machine of any or all previous examples, wherein the residue shield is configured to create a second furrow, and further comprising a second distribution mechanism configured to place fertilizer in the second furrow.

Example 6 is the agricultural planting machine of any or all previous examples, wherein the residue shield comprises a disk rotatably coupled to a support arm.

Example 7 is the agricultural planting machine of any or all previous examples, wherein the residue shield is mounted to a pivotable float arm.

Example 8 is the agricultural planting machine of any or all previous examples, wherein the residue shield is mounted to a support arm that is coupled to a second row unit such that the residue shield is lifted with the second row unit, the second row unit having a corresponding row cleaner and disk opener configured to create a second furrow for the second row.

Example 9 is the agricultural planting machine of any or all previous examples, wherein the support arm comprises a first portion that is coupled to the second row unit, and a second portion that is offset from the first portion and is coupled to the residue shield.

Example 10 is the agricultural planting machine of any or all previous examples, wherein the support arm comprises a first portion that is coupled to the second row unit and a second portion that is aligned with the first portion and is coupled to the residue shield.

Example 11 is the agricultural planting machine of any or all previous examples, wherein the residue shield comprises a concave disk having a concave surface that faces the second portion of the support arm.

Example 12 is the agricultural planting machine of any or all previous examples, wherein the concave disk is supported by a spindle that is partially received within a cavity formed by the concave surface.

Example 13 is an agricultural planting machine comprising:
 a frame assembly; and
 a plurality of row units mounted to the frame assembly and configured to plant seed in a plurality of rows, each row unit corresponding to one of the rows and comprising:
  a disk opener configured to create a furrow for planting the seed in the corresponding row;
  a row cleaner disposed in a path of the disk opener and configured to move residue from the path; and
  a residue shield configured to shield a second row from moved residue from an adjacent row.

Example 14 is the agricultural planting machine of any or all previous examples, wherein the residue shield comprises a disk rotatably coupled to a support arm.

Example 15 is the agricultural planting machine of any or all previous examples, wherein the support arm is coupled to the row unit.

Example 16 is the agricultural planting machine of any or all previous examples, wherein the support arm comprises a float arm pivotably coupled to the row unit.

Example 17 is the agricultural planting machine of any or all previous examples, wherein the agricultural planting machine comprises one of a grain drill or an air seeder.

Example 18 is a row unit for an agricultural planting machine, the row unit comprising:
 a disk opener configured to create a furrow for planting agricultural material in a crop row;
 a row cleaner disposed in a path of the disk opener and configured to move residue from the path; and
 a residue shield configured to shield the crop row from residue moved from an adjacent crop row.

Example 19 is the row unit for an agricultural planting machine of any or all previous examples, wherein the residue shield is mounted to the row unit by a support arm, wherein the residue shield is lifted with the row unit.

Example 20 is the row unit for an agricultural planting machine of any or all previous examples, wherein the support arm comprises a float arm pivotably coupled to the row unit.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An agricultural planting machine comprising:
 a frame;
 a first row unit supported by the frame, the first row unit comprising:
  a first row unit furrow opener configured to create a first furrow for planting agricultural material in a first row as the agricultural planting machine moves in a direction of travel; and
  a row cleaner disposed in a path of the first row unit furrow disk opener and configured to move residue from the path; and
 a second row unit comprising:
  a second row unit furrow opener configured to create a second furrow for planting agricultural material in a second row; and
  a residue shield configured to shield the second row from the residue, wherein at least a portion of the residue shield is positioned forward of the second row unit furrow opener relative to the direction of travel.

2. The agricultural planting machine of claim 1, wherein the agricultural planting machine comprises one of: a grain drill, an air seeder, or a row crop planter.

3. The agricultural planting machine of claim 1, wherein the agricultural material comprises seed, and further comprising a distribution mechanism configured to place the seed in the first furrow.

4. The agricultural planting machine of claim 3, wherein the residue shield is configured to create a third furrow, and further comprising a second distribution mechanism configured to place fertilizer in the third furrow.

5. The agricultural planting machine of claim 1, wherein the residue shield is supported by a support arm.

6. The agricultural planting machine of claim 5, wherein the residue shield comprises a rotatable disk.

7. The agricultural planting machine of claim 5, wherein the support arm is supported on the second row unit such that the residue shield is lifted with the second row unit, the second row unit having a corresponding row cleaner.

8. The agricultural planting machine of claim 7, wherein the support arm comprises a pivotable float arm.

9. The agricultural planting machine of claim 7, wherein the support arm comprises a first portion that is coupled to the second row unit, and a second portion that is offset from the first portion and is coupled to the residue shield.

10. The agricultural planting machine of claim 7, wherein the support arm comprises a first portion that is coupled to the second row unit and a second portion that is aligned with the first portion and is coupled to the residue shield.

11. The agricultural planting machine of claim 10, wherein the residue shield comprises a concave disk having a concave surface that faces the second portion of the support arm.

12. An agricultural planting machine comprising:
 a frame assembly; and
 a plurality of row units mounted to the frame assembly and configured to plant seed in a plurality of rows, each row unit comprising:
  a furrow opener configured to create a furrow for planting the seed in a row corresponding to the row unit as the agricultural planting machine moves in a direction of travel;
  a row cleaner disposed in a path of the furrow opener and configured to move residue from the path; and
  a residue shield configured to shield the furrow opener from residue moved by a row cleaner on another row unit, wherein at least a portion of the residue shield is positioned forward of the furrow opener relative to the direction of travel.

13. The agricultural planting machine of claim 12, wherein the residue shield comprises a disk rotatably coupled to a support arm.

14. The agricultural planting machine of claim 13, wherein the support arm is coupled to the row unit.

15. The agricultural planting machine of claim 14, wherein the support arm comprises a float arm pivotably coupled to the row unit.

16. The agricultural planting machine of claim 13, wherein the agricultural planting machine comprises one of a grain drill or an air seeder.

17. A row unit for an agricultural planting machine, the row unit comprising:
   a furrow opener configured to create a furrow for planting agricultural material in a crop row as the agricultural planting machine moves in a direction of travel;
   a row cleaner disposed in a path of the furrow opener and configured to move residue from the path; and
   a residue shield configured to shield the crop row from residue, wherein at least a portion of the residue shield is positioned forward of the furrow opener relative to the direction of travel.

18. The row unit of claim 17, wherein the residue shield is mounted to the row unit by a support arm, wherein the residue shield is lifted with the row unit.

19. The row unit of claim 17, wherein the support arm comprises a float arm pivotably coupled to the row unit.

* * * * *